2,565,746

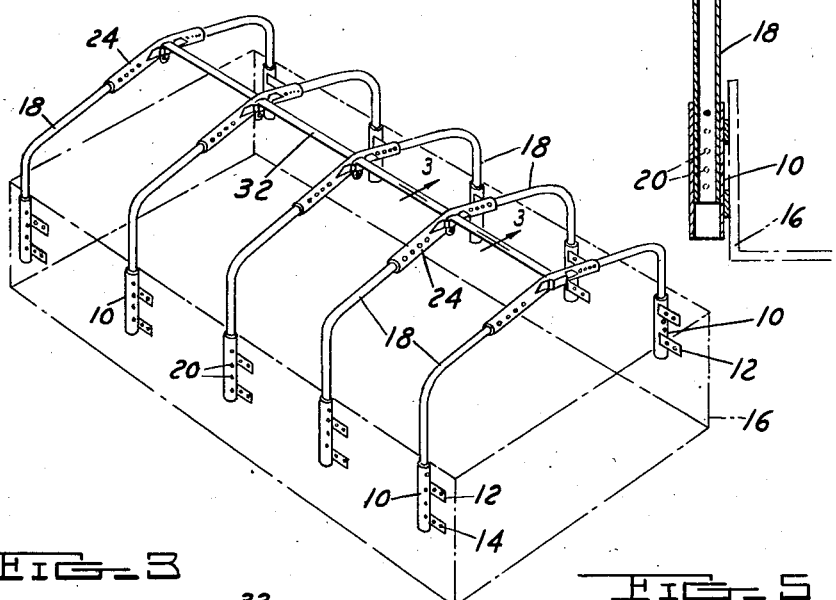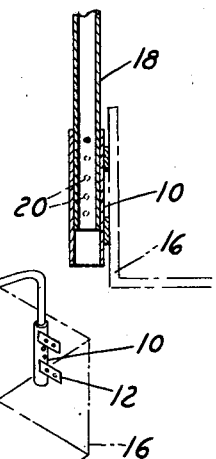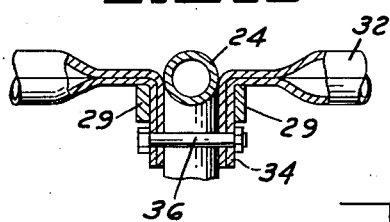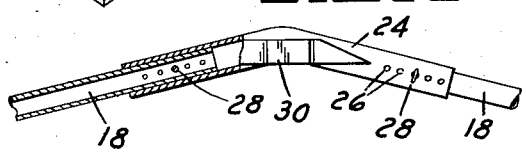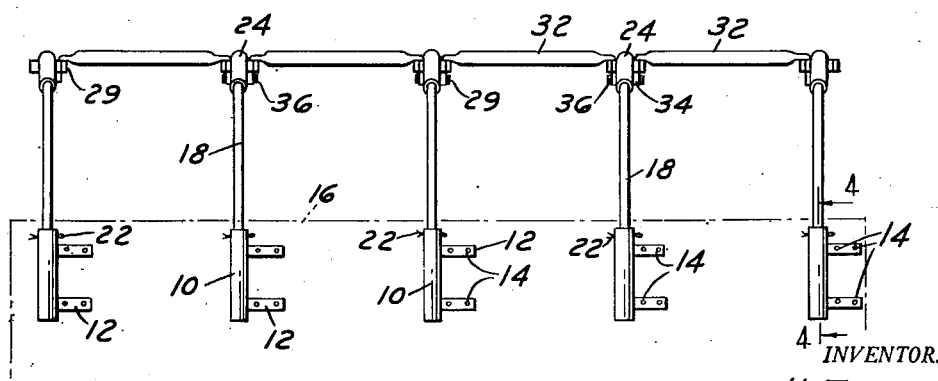
INVENTOR.
JAMES H. TURNER
BY
Burton & Parker
ATTORNEYS Patented Aug. 28, 1951

UNITED STATES PATENT OFFICE 2,565,746

SUPPORTING FRAME FOR TRUCK BODY COVERS

James H. Turner, Detroit, Mich.

Application November 14, 1949, Serial No. 127,050

2 Claims. (Cl. 296—104)

This invention relates to an improved supporting frame for the cover of a truck body.

It is the common practice to provide open truck bodies with waterproof tarpaulin covers which are supported upon a series of inverted U-shaped frames or bows. These frames are commonly formed as integral structural members bent into a U-shape and supported in the inverted position on the side walls of the open body of the truck. It is also common practice to provide a ridge pole which extends along over the bows and is secured thereto.

Over this framework assembly a canvas cover is stretched and tied down. There are disadvantages associated with this type of framework which consist of a plurality of rigid fixed bows. Because of their character the bows are commonly left up at all times even though they may interfere somewhat with the use of the truck body. If taken down they occupy considerable storage space and are bulky to handle.

It is an object of this invention to provide a framework adapted to support a tarpaulin or other cover above the open truck body, which framework is made up of a plurality of pairs of bows, each bow consisting of a plurality of sections so particularly designed and formed that several bows may be quickly disassembled into separate pieces or quickly assembled for use. The construction of the bows and ridge pole is such that all of the structure which goes to make up the frame may be knocked down into relatively small sections which may be easily handled, stored within a small space, quickly assembled together and which makes up a rigid structural frame to support a cover.

A feature of the invention is that the bows are arranged in pairs and the ridge pole is divided into a plurality of sections, one section for each pair of bows, and these sections and the bows are so formed that the ridge pole sections are capable of being quickly secured in place between the pairs of bows. The several ridge pole sections are connected together to form a ridge pole which extends the length of the framework and the connections between the several sections of the ridge pole extend underneath the bows. Another meritorious feature of this framework is that each of the bows comprise a pair of end sockets adapted to be secured to opposite sides of the truck body, a pair of complementary angular end frame parts adapted to be removably secured to the sockets and including upright portions and generally horizontally extending roof portions, and a crown part adapted to be removably secured to the angular end portions to constitute a bridge between their upper ends. Each crown part is provided on opposite sides adjacent its apex with a strap secured at the ends to the part and having its intermediate portion bowed away from the part to form a pocket therebetween. A connector extends between the two straps on opposite sides of the bow underneath the bow.

Other objects, advantages and meritorious features will more fully appear from the following description, claims and accompanying drawings, wherein:

Fig. 1 is a perspective of a framework embodying the invention mounted upon a truck body, which truck body is shown in dotted outline, Fig. 2 is a side elevation of the construction shown in Fig. 1, Fig. 3 is a sectional view taken on the line 3—3 of Fig. 1, Fig. 4 is a sectional view taken on the line 4—4 of Fig. 2, Fig. 5 is a fragmentary elevation partly in section of the connection between the crown part and the end portions of the bow.

The several bows which go to make up the complete framework are similar. As heretofore indicated they are arranged in pairs. Each bow includes a pair of complementary end sockets 10. These end sockets may be provided with straps 12 secured by screws or bolts 14 to the sides of the truck body indicated in dotted outline generally by the numeral 16. Such number of these end sockets as may be desired for the length of the framework are provided.

Each bow also includes a pair of angular end portions 18. Each angular end portion includes an upright leg which is shown as telescoped into the socket. It is adjustable within the socket. The socket may be provided with a plurality of pin apertures 20 extending therethrough. A cotter pin, bolt or the like 22 may be extended through one of the apertures in the socket and a cooperating aperture in the upright leg of the angular end part 18.

Each bow also includes a crown part 24 which crown part is so formed at its opposite ends that it may be telescoped with the upper ends of the angular end portions 18 as shown particularly in Figs. 1, 2 and 5. Each end of the crown part is provided with a series of pin openings 26 extending therethrough and a pin or bolt 28 may be extended through these openings and through a corresponding opening in the roof portion of the angular end part 18 to connect the crown part as a bridge between the end portions. Adjustment for width is provided by telescoping as described.

Each crown part has a strap 29 secured to one side thereof at its ends. Two of the straps are provided for each crown part, one secured to each side thereof as shown particularly in Figs. 2 and 3. Each strap has its intermediate portion 30 spread away from the crown part to provide a pocket and into which the end of a ridge pole section may be received. The ridge pole is divided into a plurality of sections one for each pair of bows or crown members. These sections are identical. They are indicated by the numeral 32. Each section is shown as formed from a tube having its ends flattened and bent to provide an angular end portion 34. This angular end portion is received within the pocket behind the strap 29 as shown particularly in Fig. 3. The adjacent end portions of the adjacent ridge pole sections are secured together by a connector or bolt 36 which extends therethrough and through the straps 29 below the crown part 24 of the bow.

Connected together in this manner there is provided a structural rigid framework which may be quickly set up and quickly taken down. Such a framework is adapted to support a canvas cover in a satisfactory manner. The several parts of which the framework is composed are individually small and when the framework is disassembled these parts may be stored within a small space.

What I claim is:

1. A frame for supporting a cover for a truck body comprising, in combination, a plurality of pairs of inverted U-shaped frames, each U-shaped frame having a crown portion provided on opposite sides with vertical pockets, a ridge pole section for each pair of frames, each ridge pole section having downwardly bent ends receivable within the opposite pockets of the two frames of the pair connecting said frames together, and removable securing means connecting the adjacent ends of the ridge pole sections received within the pockets on opposite sides of a U-frame together below the crown of the U-frame.

2. A supporting frame for a truck body cover comprising, in combination, a plurality of pairs of inverted U-shaped frames, each U-shaped frame consisting of two complementary upright end sockets, two complementary angular end parts, each part exhibiting an upright standard portion and a generally horizontal roof portion, the standard portion of each part adapted to be telescopically connected with an end socket at adjusted positions, a crown part extending between the opposed ends of the roof portions of the two complementary angular end parts forming a bridge therebetween, the ends of said crown part adapted to be telescopically connected at adjusted positions with the ends of said roof portions, each crown part provided on opposite sides at its apex with a strap secured at its ends thereto and having its intermediate portion bowed outwardly therefrom providing a vertical pocket on each side of the crown part, a ridge pole section extending between the crown parts of each pair of U-shaped frames, each ridge pole section having downwardly bent ends removably received within the pockets of the crown parts of the pair connecting them together, and fastening means extending between adjacent downwardly turned ends of the two ridge pole sections connected with opposite sides of each crown part, said means extending underneath said crown part.

JAMES H. TURNER.

REFERENCES CITED

The following references are of record in the file of this patent:

UNITED STATES PATENTS

| Number | Name | Date |
| --- | --- | --- |
| 160,792 | Saunders | Mar. 16, 1875 |
| 741,367 | Parish | Oct. 13, 1903 |
| 1,679,642 | Walden | Aug. 7, 1928 |
| 2,463,646 | Schassberger | Mar. 8, 1949 |